(12) United States Patent
Nakanishi

(10) Patent No.: US 8,741,463 B2
(45) Date of Patent: Jun. 3, 2014

(54) FUEL CELL

(75) Inventor: Haruyuki Nakanishi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 2064 days.

(21) Appl. No.: 11/628,958

(22) PCT Filed: Jun. 2, 2005

(86) PCT No.: PCT/JP2005/010533
§ 371 (c)(1),
(2), (4) Date: Dec. 8, 2006

(87) PCT Pub. No.: WO2005/122317
PCT Pub. Date: Dec. 22, 2005

(65) Prior Publication Data
US 2007/0298301 A1 Dec. 27, 2007

(30) Foreign Application Priority Data

Jun. 11, 2004 (JP) ................................. 2004-174735

(51) Int. Cl.
*H01M 8/24* (2006.01)
*H01M 8/02* (2006.01)
(52) U.S. Cl.
CPC ................ *H01M 8/24* (2013.01); *H01M 8/249* (2013.01); *H01M 8/0297* (2013.01)
USPC ........................................................ 429/100

(58) Field of Classification Search
CPC ............................ H01M 8/249; H01M 8/0297
USPC ..................................................... 429/31, 100
See application file for complete search history.

(56) References Cited

U.S. PATENT DOCUMENTS

| | | | |
|---|---|---|---|
| 5,916,514 A | 6/1999 | Eshraghi | |
| 5,928,808 A | 7/1999 | Eshraghi | |
| 5,989,300 A | 11/1999 | Eshraghi | |
| 6,030,718 A * | 2/2000 | Fuglevand et al. | 429/410 |
| 6,194,095 B1 * | 2/2001 | Hockaday | 429/413 |
| 6,338,913 B1 | 1/2002 | Eshraghi | |
| 6,399,232 B1 | 6/2002 | Eshraghi | |
| 6,403,248 B1 | 6/2002 | Eshraghi | |
| 6,403,517 B1 | 6/2002 | Eshraghi | |
| 6,444,339 B1 | 9/2002 | Eshraghi | |
| 6,495,281 B1 | 12/2002 | Eshraghi | |
| 2002/0076586 A1 | 6/2002 | Tanaka | |
| 2003/0203263 A1 * | 10/2003 | Brown et al. | 429/31 |
| 2004/0175605 A1 | 9/2004 | Eshraghi et al. | |
| 2005/0123815 A1 * | 6/2005 | Tsai et al. | 429/27 |
| 2005/0202315 A1 * | 9/2005 | Sugeno et al. | 429/156 |

FOREIGN PATENT DOCUMENTS

| | | |
|---|---|---|
| JP | A 4-292866 | 10/1992 |
| JP | A 5-021085 | 1/1993 |
| JP | A 7-296840 | 11/1995 |
| JP | A 9-223507 | 8/1997 |

(Continued)

*Primary Examiner* — Milton I Cano
*Assistant Examiner* — Stephen Yanchuk
(74) *Attorney, Agent, or Firm* — Oliff PLC

(57) ABSTRACT

A fuel cell assembly that includes at least one cell cartridge with two or more cell modules, a pair of electrodes and current collectors, each cell cartridge further having a fixing portion and module connecting portions; and an outer case for storing one or more cell cartridges, the outer case having a plurality of planar cartridge connecting portions.

16 Claims, 13 Drawing Sheets

(56) References Cited

FOREIGN PATENT DOCUMENTS

| JP | A 2000-182652 | 6/2000 |
| JP | A 2002-124273 | 4/2002 |
| JP | A 2002-158015 | 5/2002 |
| JP | A 2002-260685 | 9/2002 |
| JP | A 2002-539587 | 11/2002 |
| WO | WO 02/09212 A1 | 1/2002 |
| WO | WO 02/099917 A2 | 12/2002 |
| WO | WO 2004/082055 A1 | 9/2004 |

* cited by examiner

FUEL CELL

TECHNICAL FIELD

The present invention relates to a fuel cell provided with cell modules having a hollow electrolyte membrane each.

BACKGROUND ART

A fuel cell feeds two electrodes electrically connected to each other with a fuel and an oxidant respectively to cause electrochemical oxidation of the fuel so that the chemical energy is directly converted into electrical energy. Since it is not restricted within the Carnot cycle in contrast with the thermal power generation, high conversion efficiency of energy is exhibited. A solid polymer electrolyte fuel cell which is a fuel cell using a solid polymer electrolyte membrane as an electrolyte has advantages such as being easy in size reduction or operative at a low temperature, hence it attracts interests in application to power sources for portable or movable articles.

In the solid polymer electrolyte fuel cell, an anode runs a reaction of EQUATION(1) if hydrogen is used as the fuel.

$$H_2 \rightarrow 2H^+ + 2e^- \qquad \text{EQUATION(1):}$$

Electrons generated in the EQUATION(1) flow through an external circuit to work for an external load, and thereafter reach a cathode. Protons generated in the EQUATION(1) are hydrated with water and move from the anode side, through the solid polymer electrolyte membrane, to the cathode side by electroosmosis while the protons are in the hydrated state.

On the other hand, the cathode runs a reaction of EQUATION(2) if oxygen is used as the oxidant.

$$2H^+ + (1/2)O_2 + 2e^- \rightarrow H_2O \qquad \text{EQUATION(2):}$$

Water generated at the cathode mainly passes through a gas diffusion layer, and be exhausted outside.

Thus, the fuel cell exhausts no product except water, and it is a clean equipment for power generating.

A conventional solid polymer electrolyte fuel cell, which has mainly been developed, is one having a fuel cell stack obtained by stacking plurality of plane type cell units wherein the plane type cell unit is produced by disposing catalyst layers to be an anode and a cathode on one surface and the other surface of a plane-like shaped solid polymer electrolyte membrane respectively, further disposing gas diffusion layers on both sides of an obtained plane-like shaped membrane electrode assembly respectively, then interposing it between plane-like shaped separators.

In order to improve power density of the solid polymer electrolyte fuel cell, a proton conductive polymer membrane with a very thin membrane thickness is used as the solid polymer electrolyte membrane. Its membrane thickness is often 100 μm or less, and though a further thin electrolyte membrane is used for improvement of power density, a thickness of the cell unit can not extremely be reduced beyond conventional ones. Similarly, a catalyst layer, a gas diffusion layer, separator or the like are also undergoing their thickness reduction. However, improvement of power density per unit volume is limited even by the thickness reduction of all parts.

As the separator mentioned above, a sheet-like form carbon material which is excellent in corrosion resistance is generally used. The carbon material is expensive itself. In addition, a surface of the separator is often subjected to a fine work for forming grooves to be a gas channel in order to evenly supply the fuel gas and the oxidant gas over entire face of the plane-like membrane electrode assembly. Hence, the separator becomes too expensive due to such fine work and raises a manufacturing cost of the fuel cell.

In addition to the above described problems, the plane type cell unit has many problems such that a safe sealing of a periphery of plural cell units which are stacked in order to leak the fuel gas and the oxidant gas from the above mentioned gas channel is technically difficult, and such that the power generation efficiency is lowered due to distortion or deformation of the plane-like membrane electrode assembly.

Recently, a solid polymer electrolyte fuel cell whose basic unit of power generation is a cell module in which electrodes are disposed on a bore side and a shell side of a hollow electrolyte membrane respectively has been developed (refer to, for example, Japanese Patent Application Laid-open No. Heisei 9-223507, Japanese Patent Application Laid-open No. 2002-124273, Japanese Patent Application Laid-open No. 2002-158015 and Japanese Patent Application Laid-open No. 2002-260685).

In general, the fuel cell having such hollow-form cell modules does not need to use a member corresponding to a separator such as used in plane type. Besides, since power generation is carried out by feeding its bore and shell sides with gases of different kinds respectively, it is not particularly necessary to form gas channels. Therefore, its manufacturing process is estimated to reduce a manufacturing cost. Furthermore, since the cell module has a three dimensional form, it can make specific surface large with respect to a volume compared with a plane type cell unit, thus improvement of an output power density per unit volume can be expected.

As a method adapted to draw up a continuity from the cell, a stack comprising the plane type cell unit often employs a manner that cell units are stacked and pressed by loading a rather large pressure. Accordingly, a tight contact of the above mentioned membrane electrode assembly with the gas diffusion layer and the separator is improved by the loaded pressure, and an effective continuity is provided.

On the other hand, since the hollow-form cell module is constituted without a separator which serves as a current collector in the plane type cell unit to electrically connect cells with each other, another current collector is required.

DISCLOSURE OF INVENTION

A stack comprising plurality of stacked plane type cell unit is in a state that the cell units stacked as described above are pressed by loading a rather large pressure and then sealed. Hence, in a case such that some trouble is found at any component constituting the stack, it is too laborious to replace or repair a part of components constituting the stack and assemble them again.

The present invention is attained in consideration of the circumstances described above, and an object thereof is to provide a fuel cell which is easy in renewal of parts and repair.

A fuel cell according to the present invention is a fuel cell comprising an outer case storing cell cartridges each of which gathers two or more cell modules, the cell module comprising a hollow electrolyte membrane, a pair of electrodes disposed on a bore side and a shell side of the hollow electrolyte membrane and current collectors being in contact with the electrodes in the pair respectively, wherein the cell cartridge is comprised of two or more the cell modules, a fixing portion to fix the cell modules, module connecting portions to electrically connect the current collectors of the cell modules and a cathode output portion and an anode output portion to integrate cathodes and anodes of the connected cell modules respectively, wherein the outer case is comprised of a storing portion to store the two or more cell cartridges, cartridge connecting portions to electrically connect the cathode output portions and the anode output portions of the stored cell cartridges and a cathode output terminal and an anode output terminal to integrate the cathode output portions and the anode output portions of the connected cell cartridges respectively, and wherein the two or more cell cartridges are stored in the storing portion of the outer case.

As one specific embodiment of the fuel cell of the present invention, a fuel cell described above may be designed as follows:

That is to say, the each cell cartridge has a low-profile shape whose cathode output portion and anode output portion are disposed at predetermined petitions on its side faces with a narrow width; and, two or more cell cartridges are arranged in the storing portion of the outer case so as to face its front and rear faces with a large width to each other; and, the cathode output portion and the anode output portion of the each cell cartridge arranged are connected to the output portion of an unlike- or a like-pole possessed by an adjacent cell cartridge through the cartridge connecting portions regularly placed at predetermined positions on the outer case so as to be adjusted to positions of the cathode output portion and the anode output portion.

Herein, as one specific example having a low-profile shape described above, it may be designed as follows:

That is to say, at least one selected from a pair of a front and a rear faces with a large width of the cell cartridge is made of a flat plate; and, the module connecting portions are paired and placed on a pair of an upper and a lower faces with a narrow width of the cell cartridge respectively; and, the fixing portion is constituted of the flat plate and a pair of the module connecting portions.

As another specific example having a low-profile shape described above, it may be designed as follows:

That is to say, the cell cartridge has a low-profile rectangular parallelepiped shape defined by a pair of a front and a rear faces with a large width, a pair of side faces with a narrow width and a pair of an upper and a lower faces with a narrow width; and, the module connecting portions is comprised of a pair of a cathode and an anode module connecting portions; and, the cathode and the anode module connecting portions are placed on the upper and the lower faces of the cell cartridge respectively and provided with two or more holes which are capable of inserting an end portion of the cell module therein and formed with a predetermined arrangement; and, the cathode output portions are connected to both ends in a length direction of the cathode module connecting portion and bended to be placed on a pair of the side faces of the cell cartridge respectively; and, the anode output portions are connected to both ends in a length direction of the anode module connecting portion and bended to be placed on a pair of the side faces of the cell cartridge respectively; and, the each cell module is arranged so as that both ends thereof are inserted in the holes of the cathode and the anode connecting portions placed on the upper and the lower face respectively; and, a cathode current collector of the cell module is connected to the cathode module connecting portion and an anode current collector of the cell module is connected to the anode module connecting portion.

Herein, if the cell cartridge includes:

a first cell cartridge in which the anode module connecting portion is placed on the upper face, and the holes formed on the anode module connecting portion for inserting the cell module are through holes, and an opening ends of the cell modules which open at only one end are inserted in the through holes of the anode module connecting portion, and the anode current collectors of the cell modules are connected to the anode module connecting portion; and, a second cell cartridge in which the cathode module connecting portion is placed on the upper face, and the holes formed on the cathode module connecting portion for inserting the cell module are through holes, and an opening ends of the cell modules which open at only one end are inserted in the through holes of the cathode module connecting portion, and the cathode current collectors of the cell modules are connected to the cathode module connecting portion, the first and the second cell cartridges described above can be arranged alternately in the storing portion of the outer case to be serially connected.

In this case, all the cell modules of the first and the second cell cartridges are disposed so as to direct the opening ends to the upper face of the cell cartridge, and the other ends are closed, hence flow channels to be formed for feeding a fuel or an oxidant into the hollow of the cell module can be simplified in comparison with the conventional ones.

Further, if the each cell module in the fuel cell of the present invention is provided with an air electrode on the shell side of the hollow electrolyte membrane, and the cell cartridge and the outer case has an opened structure capable of allowing the outside air to freely flow into there, the air as the outside air can be naturally supplied, through a portion of the opened structure of the outer case and the cell cartridge, to the shell side of the cell module, and an air supplying equipment is not needed, thus preferable.

The fuel cell of the present invention is provided with two or more cell cartridges, each of which has plurality of the cell modules fixed and electrically connected and the cathode output portion and the anode output portion integrating cathodes and anodes of the connected cell modules respectively, and these cell cartridges are stored in the outer case and electrically connected, thereby the current output is taken out from the cathode output terminal and the anode output terminal integrating the cathodes and the anodes of the connected cell cartridge.

According to the fuel cell of the present invention, the cell cartridge can be easily stored into the outer case and easily taken out from the outer case, and it is easy to connect the cell cartridges with each other or release their connection at the time when storing or taking out the cell cartridges. Therefore, if any trouble is found at a part of the cell cartridge stored in the outer case, only the cell cartridge giving rise to this trouble can be easily taken out for repairing or replacing and easily mounted again in the outer case. Further, if the outer case gives rise to any trouble, the cell cartridges can be used ever by renewal or repair of the outer case. Accordingly, the fuel cell of the present invention is not complicated for assembling and disassembling and it is excellent in maintenance.

Further, in the case of using cell modules in which the air electrode is disposed on the shell side of the hollow electrolyte membrane and using the outer case and the cell cartridges having the opened structure capable of allowing the outside air to freely flow into there, it is not particularly necessary to provide with an air supplying source for supplying the air, and the air as the outside air can be naturally taken up from the opened structure and then supplied to the shell side of the cell module. Therefore, the air supplying equipment and a space for mounting it are not necessary, thus a fuel cell with low cost and compact size can be designed.

1. Hollow electrolyte membrane (Perfluorocarbon sulfonic acid membrane); 2. Anode; 3. Cathode; 4. Anode current collector; 5. Cathode current collector; 6. 6A. 6B. Cell module; 7. Anode module connecting portion; 8. Cathode module connecting portion; 9. 10. Flat plate; 11. Anode output portion; 12. Cathode output portion; 13. 13A. 13B. Cell cartridge; 14. Storing portion; 15. Cartridge connecting portion; 16. 17. Wall plate; 18. Bottom portion; 19. Side wall; 20. Lid; 21. Outer case; 22. Cathode output terminal; 23. Anode output terminal

BEST MODE FOR CARRYING OUT THE INVENTION

A fuel cell according to the present invention is a fuel cell comprising an outer case storing cell cartridges each of which gathers two or more cell modules, the cell module comprising a hollow electrolyte membrane, a pair of electrodes disposed on a bore side and a shell side of the hollow electrolyte membrane and current collectors being in contact with the electrodes in the pair respectively, wherein the cell cartridge is comprised of two or more the cell modules, a fixing portion to fix the cell modules, module connecting portions to electrically connect the current collectors of the cell modules and a cathode output portion and an anode output portion to integrate cathodes and anodes of the connected cell modules respectively, wherein the outer case is comprised of a storing portion to store two or more the cell cartridges, cartridge connecting portions to electrically connect the cathode output portions and the anode output portions of the stored cell cartridges and a cathode output terminal and an anode output terminal to integrate the cathode output portions and the anode output portions of the connected cell cartridges respectively, and wherein two or more the cell cartridges are stored in the storing portion of the outer case.

One embodiment of the fuel cell according to the present invention will be described hereafter with reference to FIGS. 1 to 13. Though the embodiment described below will be described mainly based on a solid polymer type fuel cell using hydrogen gas as a fuel and the air (oxygen) as an oxidant, it should be noted that the present invention is not restricted within the embodiment described below.

<Cell Module>

Figure 1:
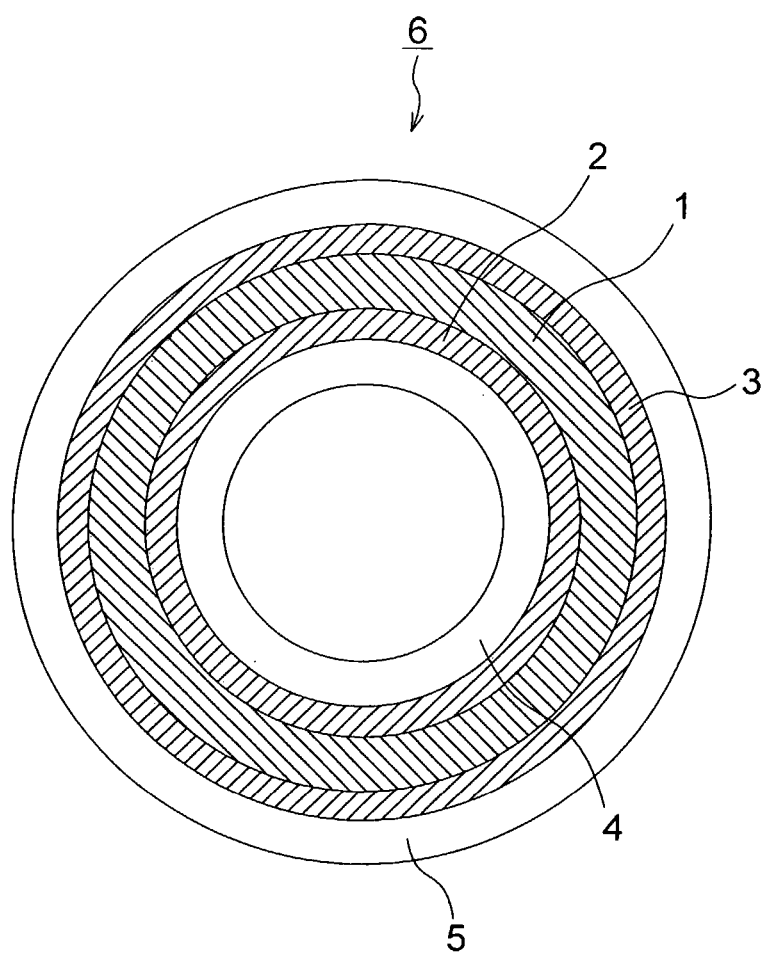
FIG. 1 is a sectional view of a tubular cell module.

FIG. 1 is a sectional view of a tubular cell module used in the fuel cell of this embodiment. The cell module 6 has a tubular solid polymer electrolyte membrane (perfluorocarbon sulfonic acid membrane) 1, an anode (it is a Fuel electrode in this embodiment) 2 disposed on a bore side and a cathode (it is an air electrode in this embodiment) 3 disposed on a shell side of the solid polymer electrolyte membrane 1, and a spring wire as an anode current collector 4 is placed on a surface of the anode 2 and a spring wire as a cathode current collector 5 is placed on a surface of the cathode 3. In general, an output terminal of the anode current collector 4 is positioned at one end of the tubular cell module, and an output terminal of the cathode current collector 5 is positioned at the other end of the same. The hydrogen gas is brought into contact with an inside of hollow of cell module having such structure and the air is brought into contact with an outside of the same, thereby a fuel and an oxidant are supplied to the anode and the cathode (the air electrode) respectively to generate the power.

The cell module may be in a state that one end of a hollow portion (the tube) is closed and the other end of the same is opened, provided that a reactant gas can be sufficiently supplied to an inside of the hollow electrolyte membrane. Particularly in this embodiment, since the hydrogen gas which has a high diffusivity of hydrogen molecule and hardly contain non-reactive substance, as a fuel gas, can be supplied to an inside of a hollow of the cell module and can be completely spent, the reactant gas can be sufficiently supplied into a hollow though one end thereof is closed. Herein, any of a cathode side and an anode side output terminals of the current collector may be positioned at an opening end of the cell module, and a position of the output terminals of the current collector may be decided in consideration of a shape of the cell cartridge, a connection between the cell cartridges, a shape of the outer case or the like. As a method to close one end of the cell module, it may be a method to put a resin or the like into one end of the hollow, but methods are not particularly limited.

Figure 6:
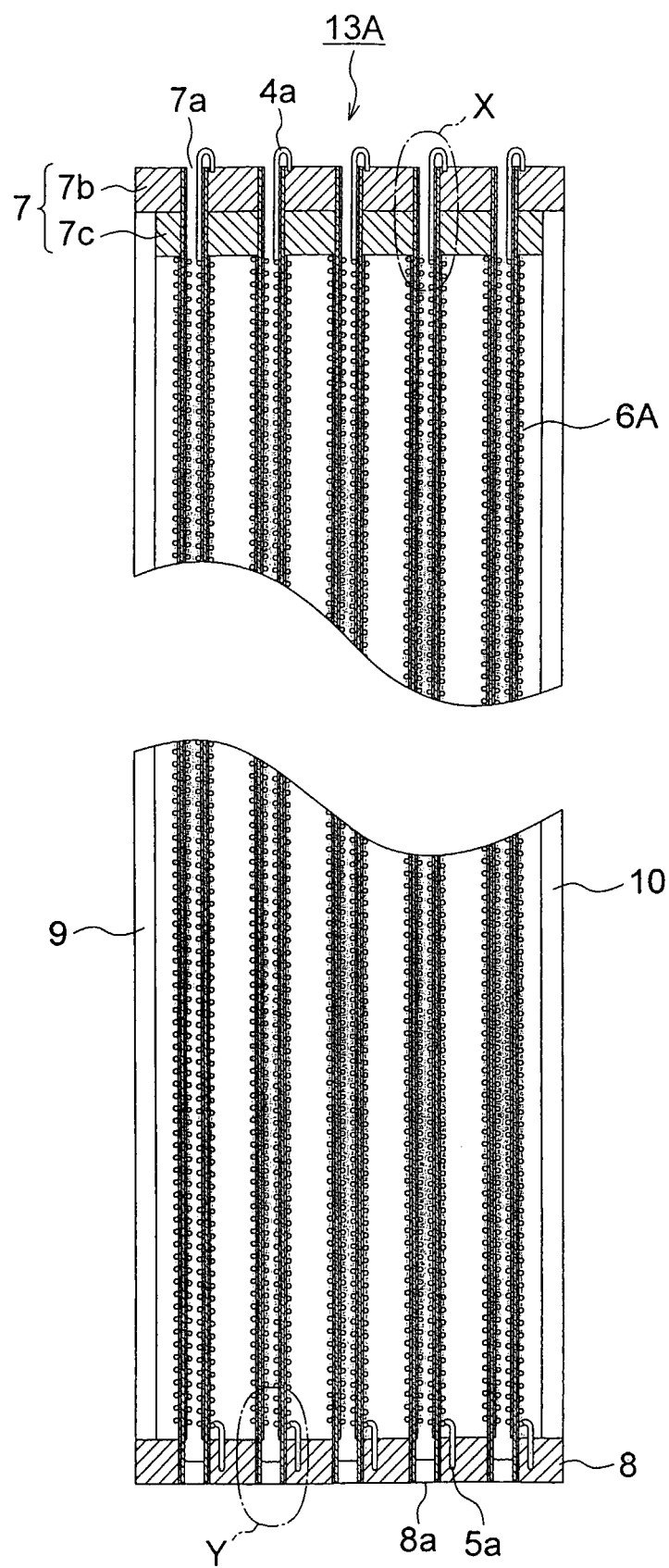
FIG. 6 is an enlarged sectional view showing one embodiment of a cell cartridge in the present invention.
Figure 7:
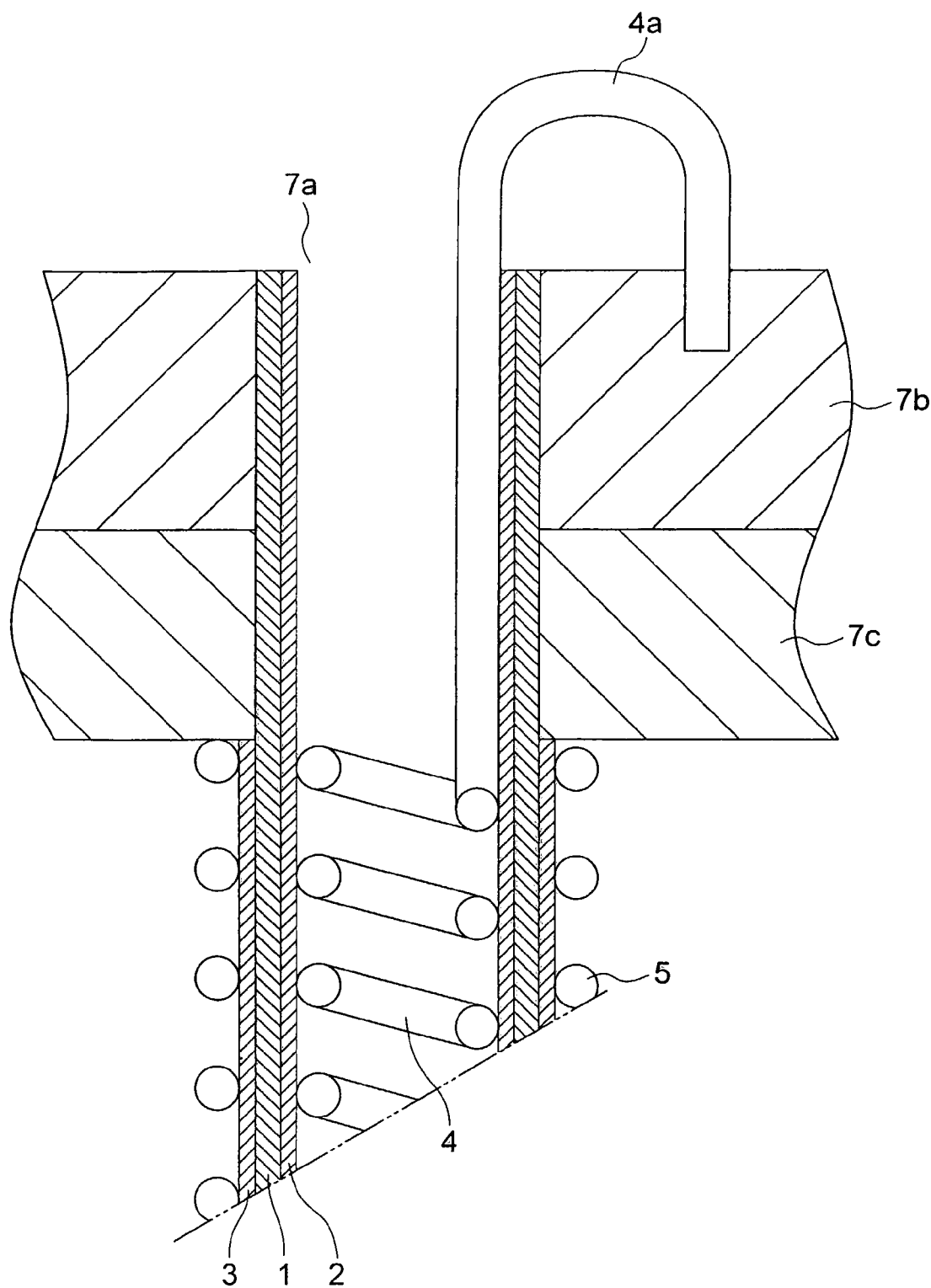
FIG. 7 is an enlarged view of a region X showed in FIG. 6.
Figure 8:
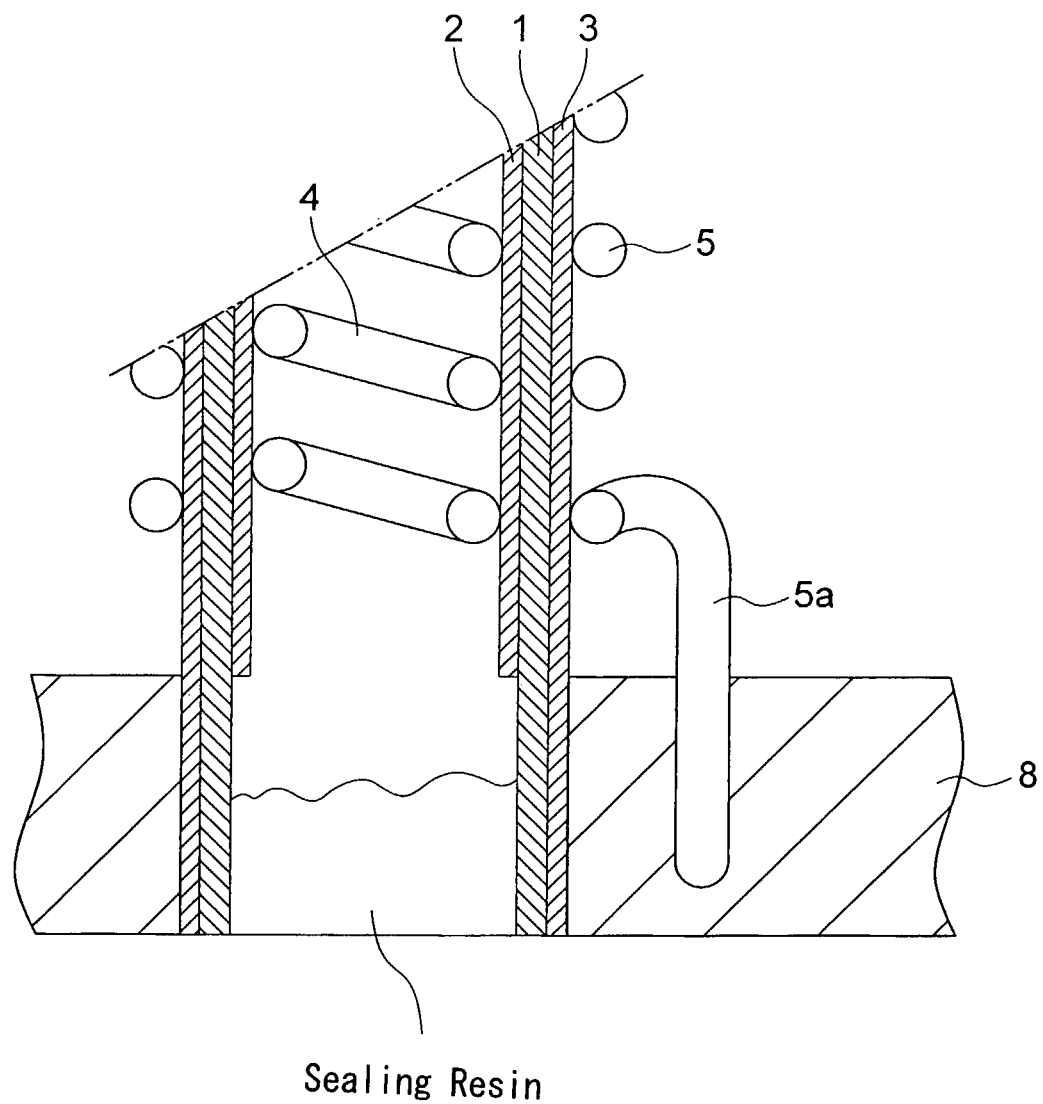
FIG. 8 is an enlarged view of a region Y showed in FIG. 6.
Figure 9:
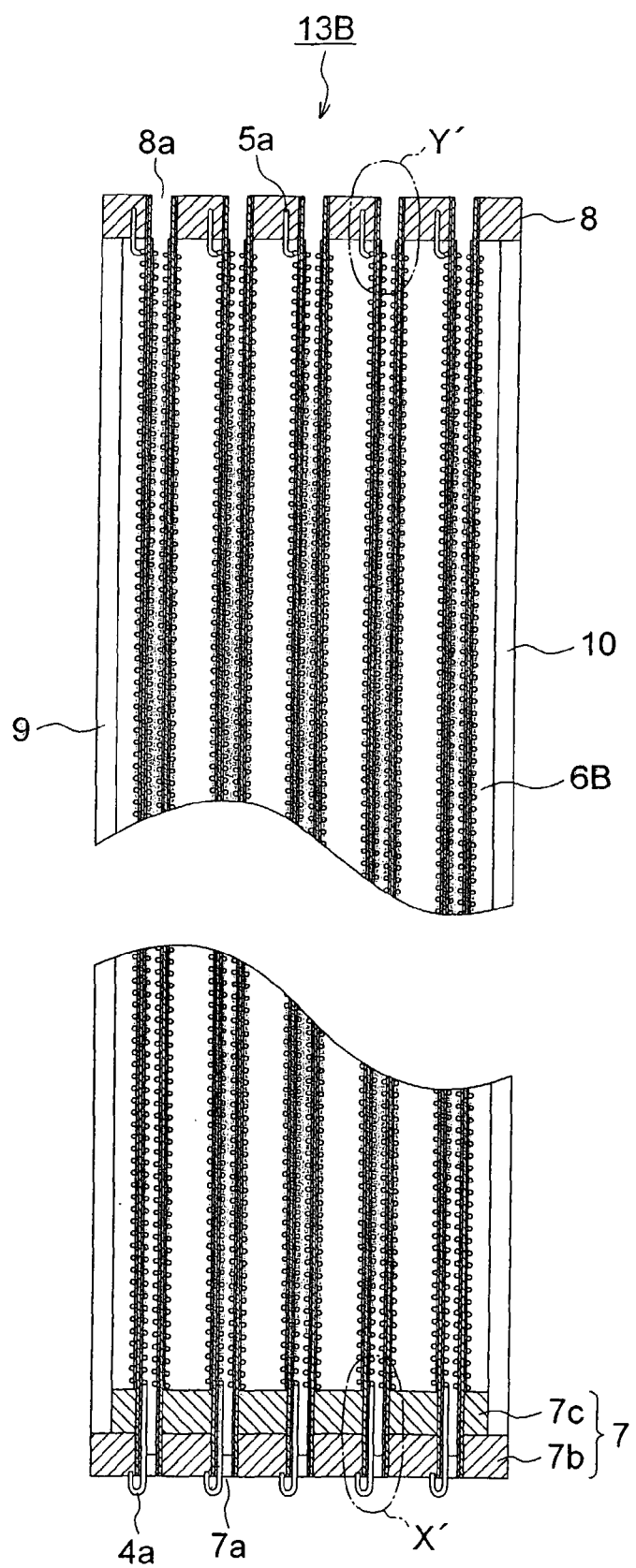
FIG. 9 is an enlarged sectional view showing one embodiment of a cell cartridge in the present invention.
Figure 10:
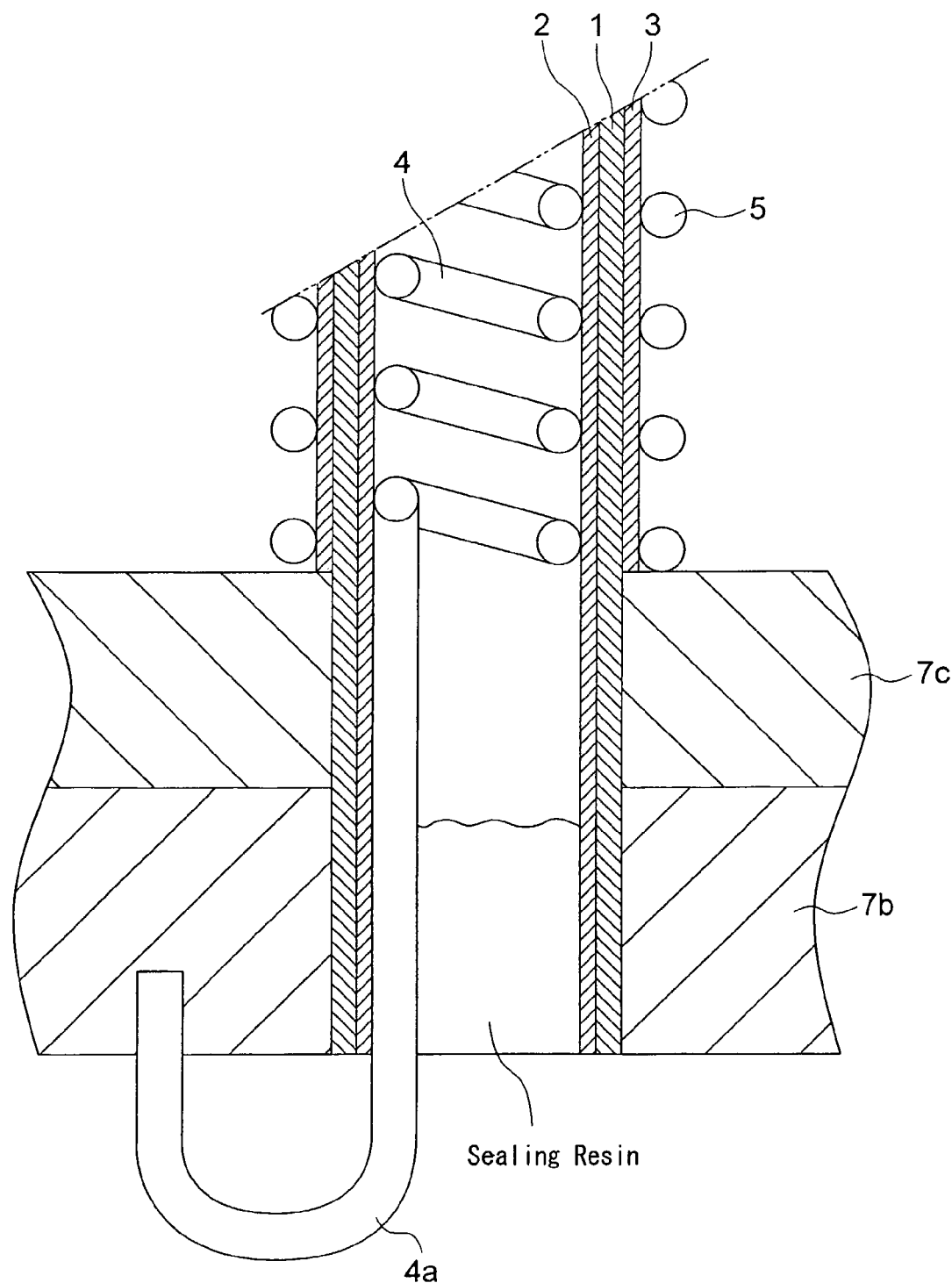
FIG. 10 is an enlarged view of a region X' showed in FIG. 9.
Figure 11:
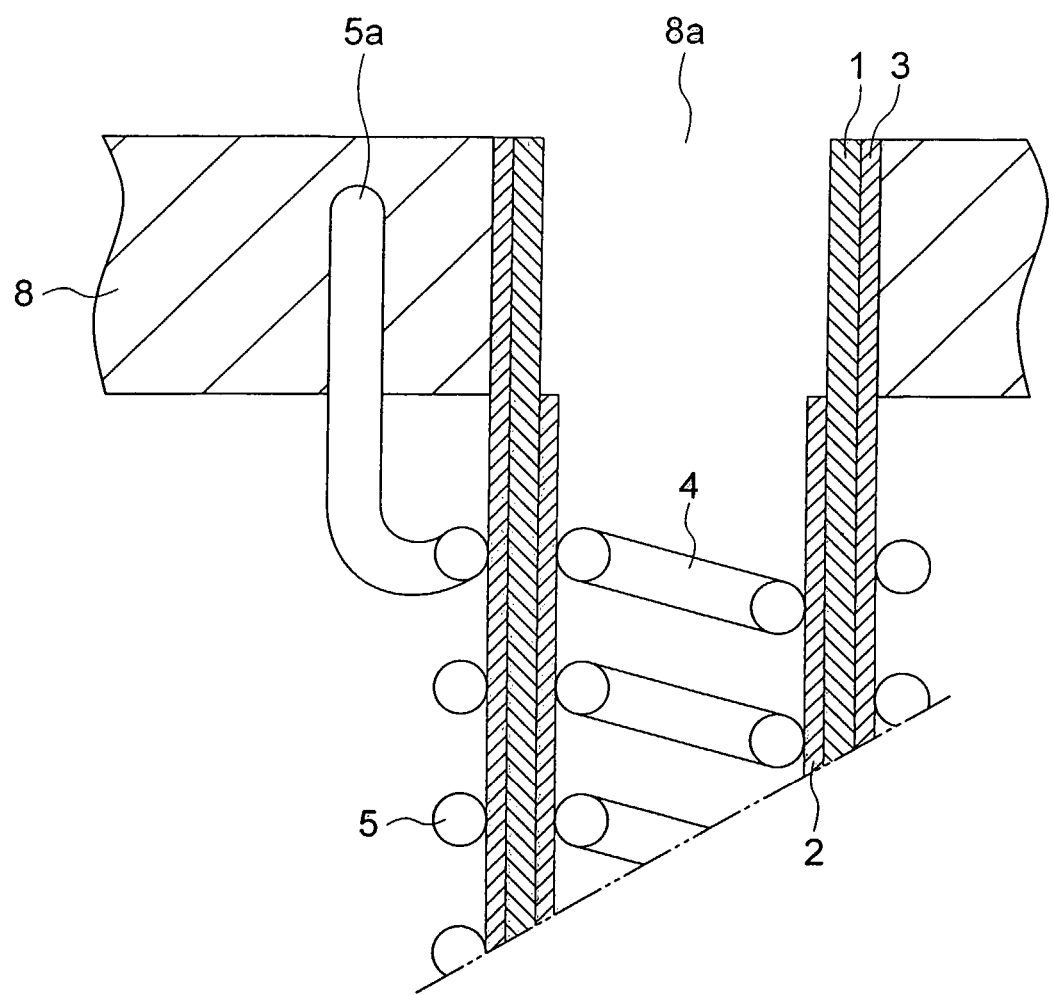
FIG. 11 is an enlarged view of a region Y' showed in FIG. 10.

In this embodiment, a cell cartridge 13A and a cell cartridge 13B are used in combination with each other, wherein as shown in FIGS. 6 to 8, a cell cartridge 13A is only provided with first cell modules 6A in which only one end is opened and an output terminal of an anode current collector (in this case, it is drawn from a bore side of hollow cell module.) is positioned at an opening end side, and wherein as shown in FIGS. 9 to 11, a cell cartridge 13B is only provided with second cell modules 6B in which only one end is opened and an output terminal of a cathode current collector (in this case, it is drawn from a shell side of hollow cell module.) is positioned at an opening end side.

Though an inside diameter, an outside diameter, a length or the like of the tubular solid polymer electrolyte membrane 1 are not particularly limited, an outside diameter of the tubular electrolyte membrane is preferably in a range of 0.01 to 10 mm, more preferably 0.1 to 1 mm, still more preferably 0.1 to 0.5 mm. A tubular electrolyte membrane with less than 0.01 mm of an outside diameter is difficult to be produced at present due to a technical problem. On the other hand, a tubular electrolyte membrane one with more than 10 mm of an outside diameter does not increase a surface area with respect to an occupied volume, hence an obtained cell module may not provide a sufficient output per unit volume.

Though a perfluorocarbon sulfonic acid membrane is preferably thin in viewpoint of improving a proton conductivity, too much thin membrane decreases a function to separate gases and increases a permeating amount of non-proton hydrogen. However, a fuel cell produced by gathering a large number of hollow-shaped cell modules can have a large electrode area in comparison with a conventional fuel cell in which plane type cell units for the fuel cell are stacked, thereby it can provide a sufficient output even if a rather thick membrane is used. To this point, a thickness of the perfluorocarbon sulfonic acid membrane is preferably 10 to 100 µm, more preferably 50 to 60 µm, still more preferably 50 to 55 µm.

Further in consideration of the above described preferable ranges of the outside diameter and the membrane thickness, a preferable range of an inside diameter is 0.01 to 10 mm, more preferably 0.1 to 1 mm, still more preferably 0.1 to 0.5 mm.

In FIG. 1, the cell module of this embodiment has a tubular electrolyte membrane. However, a hollow electrolyte membrane in the present invention is not limited to a tubular shape, and it may be one having a hollow portion and capable of run the fuel or the oxidant into the hollow to supply a reactant substance necessary for electrochemical reaction to the electrode disposed on a bore side of the hollow.

Since the fuel cell of the present invention has the hollow-shaped cell module, it can have a large electrode area per unit volume in comparison with a fuel cell having the plane type cell units. Therefore, even if a solid polymer electrolyte membrane to be used is an electrolyte membrane having a proton conductivity not so higher than that of the perfluorocarbon sulfonic acid membrane, a fuel cell having a high power density per unit volume can be obtained. As a solid polymer electrolyte membrane other than the perfluorocarbon sulfonic acid, materials used for a electrolyte membrane of the solid polymer type fuel cell can be used, and examples of polymer electrolyte include: fluorocarbon based ion exchange resin other than the perfluorocarbon sulfonic acid; polystyrene based cationic exchange membrane or the like, namely, resins based on a hydrocarbon skeleton such as "polyolefin based" and having at least one kind of proton exchange groups selected from sulfonic acid group, phosphonic acid group, phosphoric acid group or the like; solid polymer electrolytes comprising complex of a basic polymer with a strong acid, such as ones disclosed by Japanese Patent Application Laid-open (Tokuhyou) Heisei 11-503262 or the like, namely, ones prepared by doping a strong acid to a basic polymer such as polybenzimidazole, polypyrimidine, polybenzoxazole or the like. A solid polymer electrolyte membrane using such electrolyte may be reinforced with the use of perfluorocarbon polymers of fibril-form, woven fabric-form, nonwoven fabric-form, porous sheet-form or the like, or may also be reinforced by coating a membrane surface with inorganic oxide or metal. Further, the perfluorocarbon sulfonic acid membrane can also be available from the market, for example, Nafion as trade name of Du pont (the United states of America), Flemion as trade name of Asahi grass Co., Ltd. or the like.

Though the electrolyte membrane in this embodiment is explained based on the perfluorocarbon sulfonic acid membrane which is one of solid polymer electrolyte membranes as one kind of proton conductive membranes, an electrolyte membrane to be used in the fuel cell of the present invention is not particularly limited, and it may be one having proton conductivity, or one having another ion conductivity, such as conductivity of hydroxide ion, oxide ion ($O^{2-}$) or the like. The electrolyte membrane with proton conductivity is not limited to the above described solid polymer electrolyte membrane, and it is possible to use: porous electrolyte plates infiltrated with phosphoric acid aqueous solution; proton conductive materials comprising porous grass; phosphoric acid salt grass after hydro-galation; organic-inorganic hybrid proton conductive membrane which is prepared by introducing functional groups having proton conductivity into a surface and pores of porous grass having nano-sized pores; electrolyte polymer which is reinforced with the use of inorganic metal fibers; or the like. As examples of electrolyte having another ion conductivity such as hydroxide ion, oxide ion ($O^{2-}$) or the like include materials containing ceramics.

Each the electrodes disposed on the bore side and the shell side of the electrolyte membrane (the perfluorocarbon sulfonic acid membrane) may be made using materials of the electrode for the solid polymer type fuel cell. The electrode to be used is generally composed by laying a catalyst layer and a gas diffusion layer in this order from an electrolyte membrane side. The catalyst layer contains catalyst particles, and may further contain a proton conductive material in order to improve an utilizing efficiency of the catalyst particles. Materials used as the electrolyte membrane can also be used as the proton conductive material. As to the catalyst particle, preferably used is a catalyst particle in which a catalyst substance is caiird on a conductive material such as carbonaceous material, for example, carbonaceous particles or carbonaceous fibers. Since the fuel cell of the present invention has the hollow-shaped cell module, it can have a large electrode area per unit volume in comparison with a fuel cell having the plane type cell units. Therefore, even if a catalyst to be used is a catalyst having a catalyst activity not so higher than that of platinum, a fuel cell having a high power density per unit volume can be obtained. The catalyst substance is not particularly limited, provided that it has a catalyst activity effective to the oxidation reaction of hydrogen in the anode or the reduction reaction of oxygen in the cathode. For example, it can be selected from metals such as platinum, ruthenium, iridium, rhodium, palladium, osmium, tungsten, lead, iron, chromium, cobalt, nickel, manganese, vanadium, molybdenum, gallium, aluminum; or alloys based on these metals. Preferable is Pt and alloys containing Pt and another metal such as Ru. As the gas diffusion layer, a conductive material containing, as a major component, a carbonaceous material such as carbonaceous particles and/or carbonaceous fibers can be used. The size of the carbonaceous particles and carbonaceous fibers mat be optimally selected in consideration of the dispersivity in a solution for producing the gas diffusion layer, the drainability of the gas diffusion layer to be obtained or the like. As to a structure, materials of the electrode, each of the electrodes disposed on the bore and the shell sides of the electrolyte membrane may be the same or different from each other. In order to improve the drainability for water such as the generated water, the gas diffusion layer is preferably subjected to a water repellent treatment in such manner that: the gas diffusion layer is infiltrate with any material, such as polytetrafluoroethylene, polyvinylidene fluoride (PVDF), polytetrafluoroethylene, perfluorocarbon alkoxylalkane, ethylene-tetrafluoroethylene polymer, or mixtures based on them, or the like; or a water repellent layer is formed with the use of the materials mentioned above.

Methods to produce the cell module in which a pair of electrodes are disposed on the bore side and the shell side of the tubular electrolyte membrane are not particularly limited. For example, a method may be as follows: a tubular electrolyte membrane is provided in the beginning; a solution containing an electrolyte and catalyst particles is applied to the bore side and the shell side of the electrolyte membrane and dried the same to form catalyst layers; a solution containing carbonaceous particles and/or carbonaceous fibers is applied to both the catalyst layers and dried the same to form the gas diffusion layer. In this method, the catalyst layer and the gas diffusion layer are formed so as to allow a hollow portion to be present at an inner side of the gas diffusion layer formed on the bore side of the electrolyte membrane.

Alternatively, a method may also be as follows: a member (a tubular carbonaceous material) which contains a carbonaceous material such as the carbonaceous particles and/or carbonaceous fibers and is formed into a tubular form is used as a gas diffusion layer of a first electrode (the anode) in the beginning; a solution containing an electrolyte and catalyst particles is applied to the shell side of the gas diffusion layer and dried the same to form a catalyst layer, thereby a first electrode is produced; next, a solution containing an electrolyte is applied to the shell side of the catalyst layer and dried the same to form an electrolyte layer; further, a catalyst layer of a second electrode (the cathode) on the shell side of the electrolyte layer; a solution containing a carbonaceous material is applied to the shell side of the catalyst layer and dried the same to form a gas diffusion layer.

Methods to produce the tubular electrolyte membrane are not particularly limited, and a commercial product of a tubular form electrolyte membrane can also be used. The tubular carbonaceous material may also be obtained in such manner that: a carbonaceous material such as carbonaceous particles and an epoxy based and/or a phenol based resin are dispersed in a solvent; it is formed into a tubular form and then thermally hardened; thereafter, it is baked.

Solvents to be used for forming the electrolyte membrane, the catalyst layer and the gas diffusion layer may be properly selected in accordance with materials to be dispersed and/or dissolved. Also, coating methods for forming each the layer may be properly selected from various methods such as a spray coating, a brush coating or the like.

The cell module having the tubular form to be used in the fuel cell of the present invention is not limited to the structures exemplified above, and it may be provided with any layer other than the catalyst layer and the gas diffusion layer for the purpose of improving functions of the cell module. Though the hollow electrolyte membrane of this embodiment is provided with the anode on the bore side and the cathode on the shell side, it may be provided with a cathode on the bore side and an anode on the shell side.

The anode current collector 4 and the cathode current collector 5 can be produced by, for example, winding a metal wire in a spring-like form. A metal to be preferably used may be at least one kind of metals selected from Al, Cu, Fe, Ni, Cr, Ta, Ti, Zr, Sm, In or the like, or may be alloys based on these metals such as stainless steel. A surface thereof may further be coated with Au, Pt, a conductive resin or the like. In the view point of excellent corrosion resistance, stainless or titanium is preferable among them. A gauge of the wire or a winding number of the spring is not particularly limited.

When the anode current collector 4 is produced, it is preferable to make an outside diameter of the spring slightly larger than an inside diameter of the tubular solid polymer electrolyte membrane 1. A slightly large anode current collector 4 which is put in a hollow of the solid polymer electrolyte membrane 1 comes in contact with the anode in a state that a pressure is slightly loaded, and thus an electric connection between the anode current collector 4 and the anode becomes a good state.

Also, when the cathode current collector 5 is produced, it is preferable to make an inside diameter of the spring slightly small than an outside diameter of the tubular solid polymer electrolyte membrane 1. A slightly small cathode current collector 5 which is put on a shell side of the solid polymer electrolyte membrane 1 comes in contact with the cathode in a state that a pressure is slightly loaded, and thus an electric connection between the cathode current collector 5 and the cathode becomes a good state.

Though this embodiment uses such spring wire-like current collector 4, 5, shapes thereof are not limited to the spring wire-like form, and shapes are optional provided that it is made of an electroconductive material. Accordingly, it may be linear or cylindric, and for example, one formed of a straight linear metal wire or a sheet-like material such as metal foil, metal sheet or carbon sheet may be employed. A current collector of these is fixed on the electrode by a conductive adhesive such as carbon based adhesive, Ag paste or the like, if needed.

<Cell Cartridge>

The fuel cell of the present invention is provided with two ore more cell cartridges, each of which is comprised of two or more the cell modules as described above, a fixing portion to fix the cell modules, module connecting portions to electrically connect the current collectors of the cell modules and a cathode output portion and an anode output portion to integrate cathodes and anodes of the connected cell modules respectively.

This cell cartridge is capable of being taken up from the outer case and installed in the outer case while preventing the cell modules in the cell cartridge from breakage, and while keeping a state of electric connection between each of the cell modules in the cell cartridge.

Specific structures and shapes or the like of the cell cartridge are not particularly limited, and one example may be as follows: it has a low-profile shape whose cathode output portion and anode output portion are disposed at predetermined petitions on its side faces with a narrow width; and, it can be arranged while its front and rear faces with a large width are made to face toward a rear face and a front face of adjacent cell cartridges respectively. Herein, a low-profile shape is not limited to a rectangular parallelepiped shape, and such one as capable of being arranged and stored in the outer case described below is acceptable. It should be noted that the present invention does not exclude the use of cell cartridges of any shapes, such as a cubic shape or the like, other than the low-profile shape.

Figure 2:
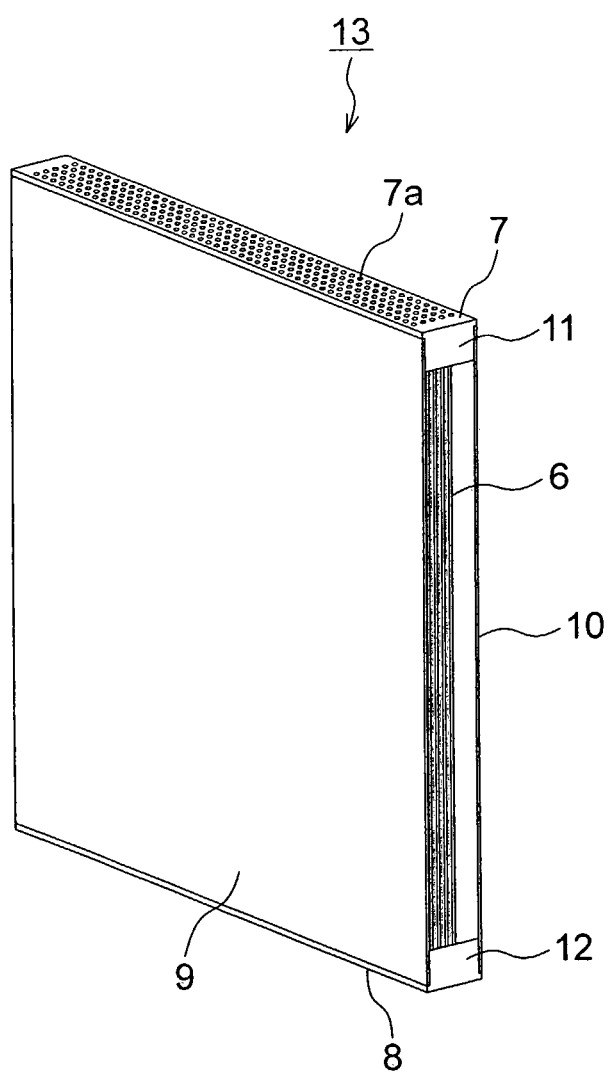
FIG. 2 is a schematic view showing one embodiment of a cell cartridge in the present invention.
Figure 3:
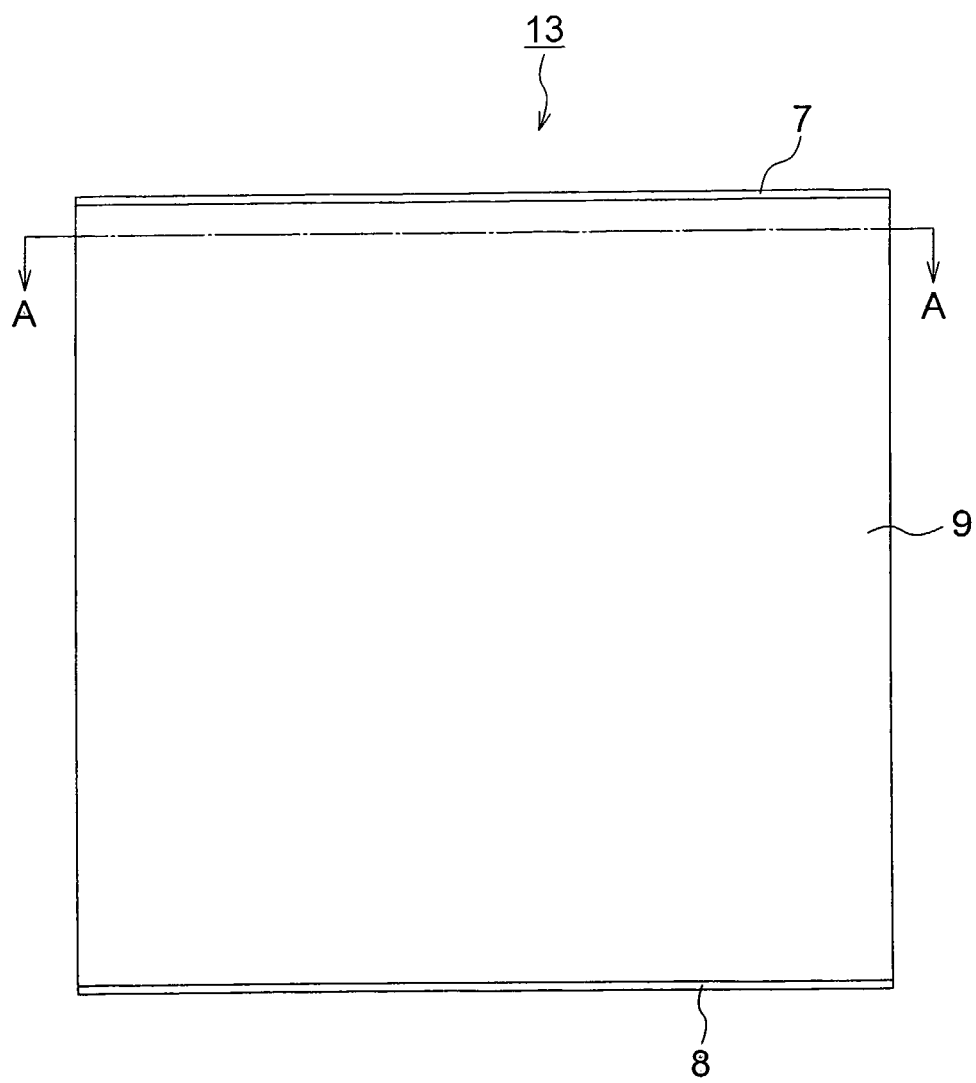
FIG. 3 is a front (a rear) view of a cell cartridge showed in FIG. 2.
Figure 4:
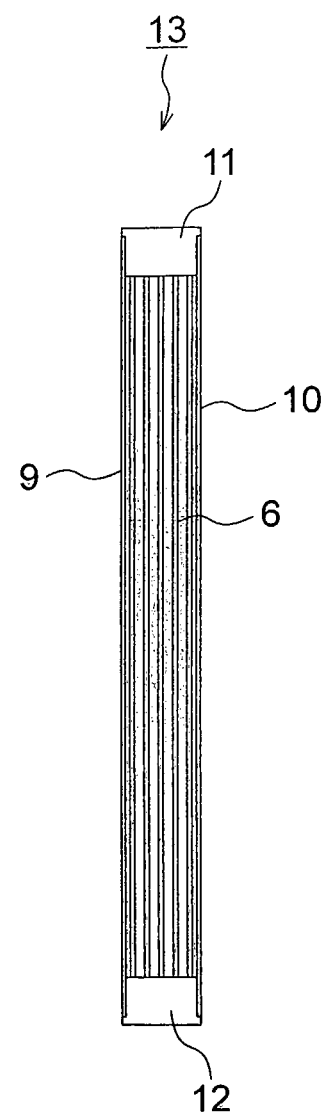
FIG. 4 is a side view of a cell cartridge showed in FIG. 2.
Figure 5:
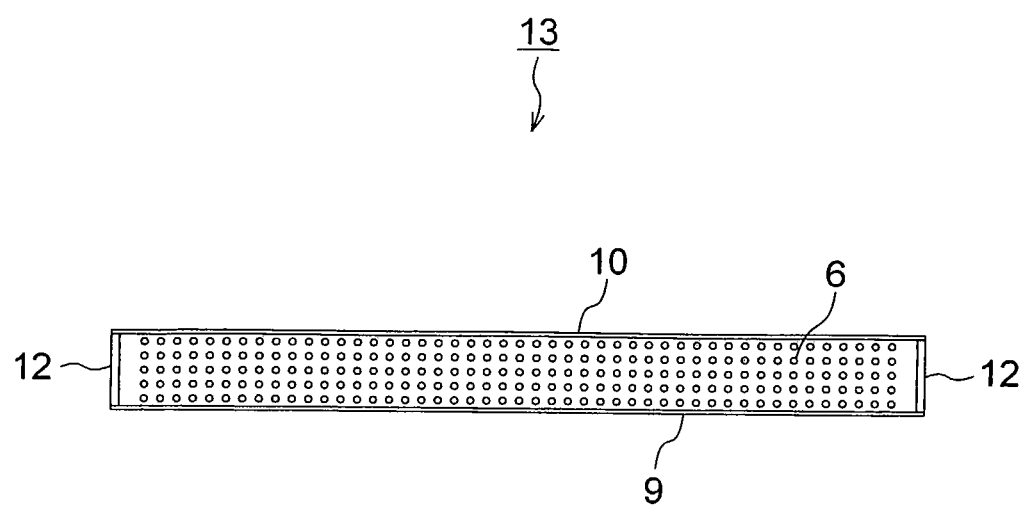
FIG. 5 is a A-A sectional view of a cell cartridge with respect to FIG. 3.

The cell cartridge in the present invention will be described in detail hereafter with reference to FIGS. 2 to 11. FIG. 2 is a perspective view schematically showing a cell cartridge provided with the cell modules shown in FIG. 1. FIG. 3 is a view in which the cell cartridge 13 shown in FIG. 2 is looked from an opposite side toward one of a front and a rear face those have a large width and pair up. FIG. 4 is a view in which the cell cartridge 13 is looked from an opposite side toward one of side faces those have a small width and pair up. FIG. 5 is a view in which a A-A section in FIG. 3 is looked from an upper side.

As the cell cartridge 13 in this embodiment, a cell cartridge 13A and a cell cartridge 13B are used in combination with each other, wherein as shown in FIGS. 6 to 8, a cell cartridge 13A is only provided with first cell modules 6A in which only one end is opened and an output terminal of an anode current collector (in this case, it is drawn from a bore side of hollow cell module.) is positioned at an opening end side, and wherein as shown in FIGS. 9 to 11, a cell cartridge 13B is only provided with second cell modules 6B in which only one end is opened and an output terminal of a cathode current collector (in this case, it is drawn from a shell side of hollow cell module.) is positioned at an opening end side. The cell modules 6A and 6B are different from each other in only one point that one end which is opened (the opening end) is present at a side where the output terminal of the anode current collector is placed or a side where the output terminal of the cathode current collector is placed, and another points of structure are same. Accordingly, the first cell cartridge 13A using the cell modules 6A as the cell module will mainly be explained herein.

The cell cartridge 13A has a pair of a front and a rear faces with a large width which are composed of flat plates 9 and 10 and a pair of an upper and a lower faces with a narrow width which are composed of an anode module connecting portion 7 and a cathode module connecting portion 8, and defines a low-profile rectangular parallelepiped shape. Plurality of the tubular cell modules 6A are fixed by the flat plates 9 and 10 and the anode module connecting portion 7 and the cathode module connecting portion 8, and the anode current collector 4 is electrically connected to the anode module connecting portion 7, and on the other hand the cathode current collector 5 is electrically connected to the cathode module connecting portion 8. Each of the side faces which pair up is provided with an anode output portion 11 and an cathode output portion 12, wherein the anode output portion 11 are connected to both ends in a length direction of the anode module connecting portion 7 and the cathode output portion 12 are connected to both ends in a length direction of the cathode module connecting portion 8. The cell cartridge 13A is provided with openings between a lower end of the anode output portion 11 and an upper end of the cathode output portion 12 disposed on each of the pairing side faces with a narrow width, and accordingly has an opened structure capable of allowing the outside air to freely flow into inside space of the cell cartridge.

Respectively to the anode module connecting portion 7 and the cathode module connecting portion 8, holes (through holes) 7a and 8a which are capable of inserting an end portion of the cell module 6A therein are formed with a predetermined arrangement. The cell modules 6A are fixed and arranged by inserting their both ends into the through holes 7a and 8a, and further fixed by the flat plate 9 and 10 so as to keep their configuration of a length direction of the tubular shape. The hole capable into which the end portion of the cell module 6A can be inserted is generally a through hole, however, it may be a hole not penetrated such as a dent, if an end portion of the cell module to be inserted therein is closed.

In this embodiment, a pair of a front and a rear faces with a large width of the cell cartridge 13A is composed of two flat plates, however it may be acceptable to have only one flat plate, provided that the cell modules can be protected and fixed. The flat plate as the fixing portion is made of material capable of protecting and fixing the cell modules and insulating adjacent cell cartridges from each other. As to such materials, insulating material such as polycarbonate, epoxy grass, nylon, polyethersulfone (PES) or the like may be used. Though the module connecting portions 7, 8 in this embodiment associate with the flat plates 9, 10 to serve as the fixing portion of the cell modules, a fixing portion which is free from the module connecting portion and different from the flat plate described above may be provided.

FIG. 6 is an enlarged longitudinal sectional view of a cell cartridge 13A, and it further shows a bore side space of the cell module 6A. FIGS. 7 and 8 are enlarged views of a region X and a region Y of FIG. 6. Based on these drawings, an electric connection between the anode module connecting portion 7 and the anode current collector 4 and an electric connection between the cathode module connecting portion 8 and the cathode current collector 5 will be explained.

As shown in FIG. 7, an opening end (an upper end) where an output terminal 4a of the anode current collector 4 of the cell module 6a is inserted in the through hole 7a of the anode module connecting portion 7, and the output terminal 4a of the anode current collector 4 extending from an inside space of the hollow is electrically connected to a conductive layer 7b made of electroconductive material of the anode module connecting portion 7. In this embodiment, an insulating layer 7c is disposed on a cell module side of the anode module connecting portion 7 in order to prevent a short circuit due to a contact of the anode current collector 4, the anode 2 with the cathode current collector 5, the cathode 3. However, it may be not possible to provide the insulating layer 7c depending on the design of the cell cartridge. The opening end of the cell module 6A inserted into the through hole 7a of the anode module connecting portion 7 is inserted into and connected to the anode module connecting portion 7 in a state that hydrogen gas can be supplied into the hollow space of the hollow electrolyte membrane through the through hole 7a.

On the other hand, as shown in FIG. 8, a closed end (a lower end) where an output terminal 5a of the cathode current collector 5 is inserted in the through hole 8a of the cathode module connecting portion 8, and the output terminal 5a of the cathode current collector 5 extending from a shell side of the cell module is electrically connected to the cathode module connecting portion 8 made of electroconductive material. Though the cathode module connecting portion 8 shown in FIG. 8 has an insulating state between the anode side and the cathode side, and accordingly provided with no insulating layer, the insulating layer may be disposed in the cathode module connecting portion 8 if needed. One end of the cell module 6A which is a portion inserted into the through hole 8a of the cathode module connecting portion 8 is sealed by a resin in advance.

An electroconductive material which forms the conductive layer 7b of the anode module connecting portion 7 and the cathode module connecting portion 8 is not particularly limited, and the electroconductive material to be preferably used may be at least one kind of metals selected from Al, Cu, Fe, Ni, Cr, Ta, Ti, Zr, Sm, In or the like, or may be alloys based on these metals such as stainless steel. As the conductive layer 7b disposed in the anode module connecting portion 7, an insulating material such as polycarbonate, epoxygrass, nylon, PES or the like can also be used. A specific method to connect the conductive layer and the current collector may be properly selected from ordinary methods, and examples thereof contain soldering, caulking or the like.

All the cell module 6A connected to the cell cartridge 13A are parallel-connected in which, as described above, the anode current collector 4 is connected to the anode module connecting portion 7 and the cathode current collector 5 is connected to the cathode module connecting portion 8. However, a connecting formation between the cell modules within one cell cartridge is not limited to such formation in which all the cell module are parallel-connected, and it may be a formation wherein all the cell module are serially-connected, or a formation wherein a parallel connection and a serial connection are coexistent using the cell modules 6A and 6B.

The anode module connecting portion 7 connecting to the anode current collectors 4 of the respective cell modules is connected to the anode output portion 11 and the cathode module connecting portion 8 connecting to the cathode current collectors 5 of the respective cell modules is connected to the cathode output portion 12, and thereby the anodes and the cathodes of the respective cell modules are integrated and the current of the cell cartridge is output from the anode output portion 11 and the cathode output portion 12. In the cell cartridge shown in FIG. 6, both ends of a length direction of the anode module connecting portion 7 is extended and bended to form the bended end portions as the anode output portion 11, and both ends of a length direction of the cathode module connecting portion 8 is worked in the same manner to form the cathode output portion 12.

As shown in FIGS. 9 to 11, the second cell cartridge 13B using the second cell modules 6B has the same construction as that of the first cell cartridge 13A except that: the cell modules 6A are replaced with the cell modules 6B; the cathode module connecting portion 8 is placed at an upper face;

and the anode module connecting portion 7 is placed at a lower face. Herein, FIG. 10 and FIG. 11 are enlarged views of a region X' and a region Y' in FIG. 9.

<Outer Case>

The fuel cell of the present invention is characterized in that the two or more cell cartridges described above are stored in the outer case which is comprised of a storing portion to store the two or more cell cartridges, cartridge connecting portions to electrically connect the cathode output portions and the anode output portions of the stored cell cartridges and a cathode output terminal and an anode output terminal to integrate the cathode output portions and the anode output portions of the connected cell cartridges respectively.

Figure 12:
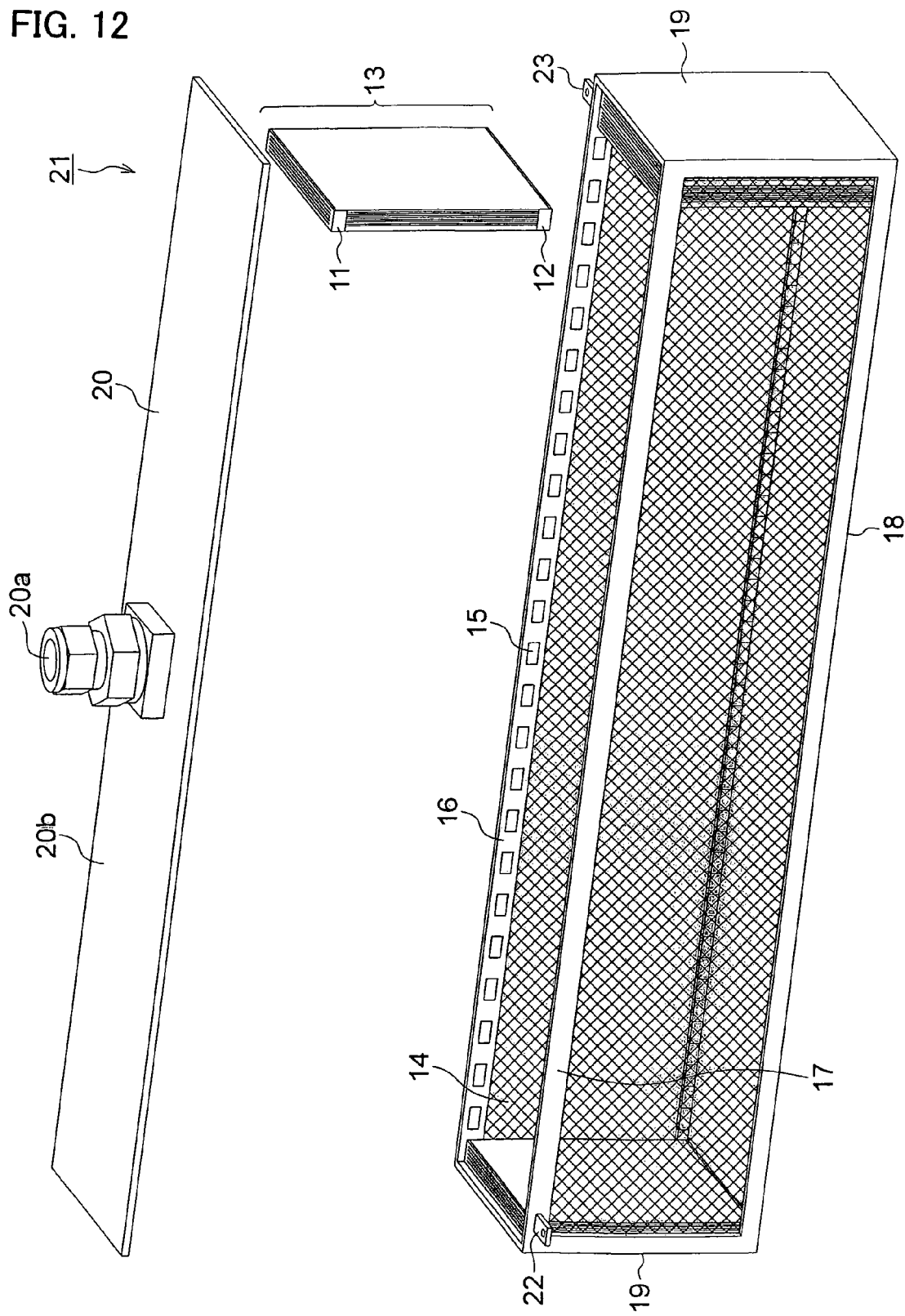
FIG. 12 is a view showing one embodiment of an outer case in the present invention.

The outer case will be described hereafter with reference to FIG. 12. FIG. 12 is an outer case 21 which can store cell cartridges 13 (the cell cartridges 13A and 13B). The outer case 21 has a storing portion which is capable of storing the two or more cell cartridges 13 and arranging in such manner that front and rear faces with a large width of the cell cartridges are made to face toward a rear face and a front face of adjacent cell cartridges respectively.

The storing portion 14 is defined by a pair of a front and a rear wall plates 16 and 17 those are provided with cartridge connecting portions 15, a bottom portion 18 and side walls 19, and it is a body portion surrounding the cell cartridges arranged and stored in the above described manner. The cell cartridges 13 stored in the storing portion 14 can individually be taken up from and put in the storing portion. The storing portion 14 is not limited to the body portion shown in FIG. 12 provided that it can store two or more cell cartridges, and it may be one having a framework structure or one like a tray capable of loading the cell cartridges 13. In this embodiment, the wall plates 16 and 17 has a mesh-like opened structure except a framework surrounding its own periphery so that the outside air can freely flow into the outer case.

In this embodiment, the first cell cartridges 13A are in a state that, as shown in FIG. 6, the anode output portion 11 is positioned in vicinity of an upper face and the cathode output portion 12 is positioned in vicinity of a lower face, on the other hand, the second cell cartridges 13B are in a state that, as shown in FIG. 9, the cathode output portion 12 is positioned in vicinity of an upper face and the anode output portion 11 is positioned in vicinity of a lower face, and the first and the second cell cartridges are alternately arranged and stored in the storing portion of the outer case. Thereby, they are serially connected. Herein, every opening ends of the cell modules possessed by both of the cell cartridges is directed toward an upper face and opened.

The cartridge connecting portions 15 are placed at predetermined positions with a regular interval on an inner side of the wall plates 16 and 17 so as to be adjusted to positions of the anode output portion 11 and the cathode output portion 12 those are disposed at upper sides and lower sides on a pair of side face of the stored cell cartridges 13. When the cell cartridges 13 are stored at a predetermined positions in the storing portion, the anode output portion 11 and the cathode output portion 12 are naturally come into contact with the cartridge connecting portions 15 to form connections.

Figure 13:
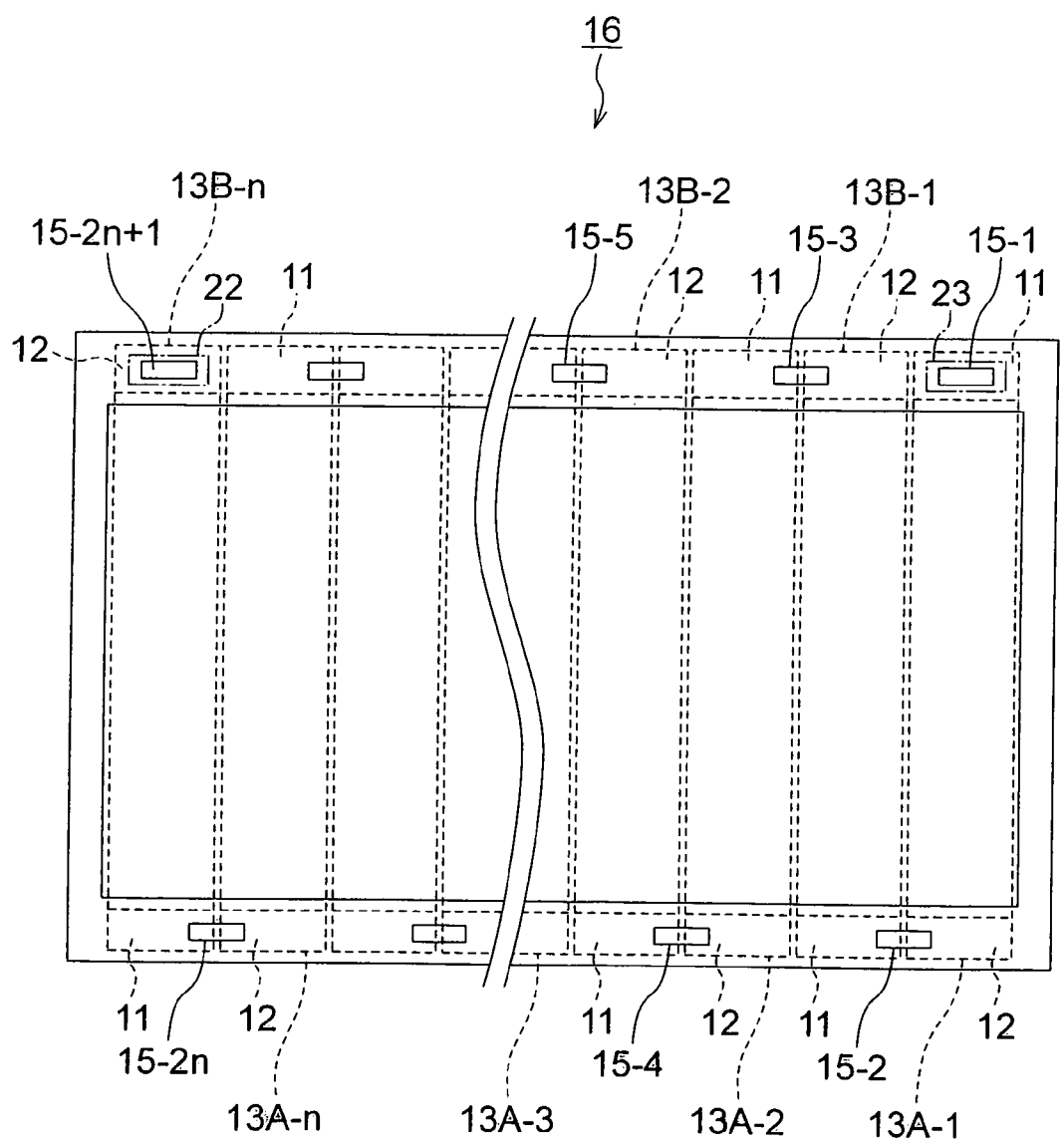
FIG. 13 is a schematic view describing an electrical connection of a cell cartridge.

Herein, an electric connection of the output portions of the cell cartridges with the cartridge connecting portions will be described in detail in reference to FIG. 13. FIG. 13 shows an arrangement state of the cell cartridges 13A and 13B with respect to the cartridge connecting portions 15 when the first cell cartridges 13A and the second cell cartridges 13B are alternately arranged and stored in the outer case 21 of FIG. 12, and it is a view looking at the wall plate 16 from an inside of the outer case. In FIG. 13, the cell cartridges 13A and 13B are expressed by a dotted line. Further, in FIG. 13, the cathode output terminal 22 is expressed by a dashed line for expedience. However, the cathode output terminal 22 is disposed on an outer side of the wall plate 17. Still further, the wall plate 17 is provided with the cartridge connecting portions at positions to be symmetric when the wall plate 16 is made to be opposite, and they make pairs with cartridge connecting portions disposed on the wall plate 16.

First, as to a cell cartridge (13A-1) stored at a rightmost position of the outer case 21 in FIG. 13, its anode output portion 11 is connected to the cartridge connecting portion (15-1) which connects to an anode output terminal 23 disposed on the outside of the wall plate 16, and its cathode output portion 12 is connected to the cartridge connecting portion (15-2). Next, as to a cell cartridge (13B-1) stored at a position adjacent to the cell cartridge (13A-1), its anode output portion 11 is connected to the cartridge connecting portion (15-2), and its cathode output portion 12 is connected to the cartridge connecting portion (15-3). Further, as to a cell cartridge (13A-2) stored at a position adjacent to the cell cartridge (13B-1), its anode output portion 11 is connected to the cartridge connecting portion (15-3), and its cathode output portion 12 is connected to the cartridge connecting portion (15-4). As described above, the cell cartridges 13A and 13B stored in the outer case 21 are in a state that they are alternately arranged, and their anode output portions 11 or cathode output portions 12 are connected to an output portion of an unlike-pole possessed by an adjacent cell cartridge through the cartridge connecting portion 15, and thereby serial connections are sequentially formed.

As to a cell cartridge (13B-n) stored at a leftmost position of the outer case 21 in FIG. 13, its anode output portion 11 is connected to the cartridge connecting portion (15-2n), and its cathode output portion 12 is connected to the cartridge connecting portion (15-2n+1) which connects to a cathode output terminal 22 disposed on the outside of the wall plate 17. A electric power of this fuel cell in which n pieces of the cell cartridges 13A and n pieces of the cell cartridges 13B are serially-connected is output from the cathode output terminal 22 and the anode output terminal 23 disposed on the outside of the outer case. For material of the cartridge connecting portions, the anode output terminal and the cathode output terminal, materials similar to those of the conductive layer of the above described module connecting portion can be used.

Though the serial connection of the cell cartridges is described herein, methods to connect the cell cartridges in the outer case are not limited to the serial connection. For example, a parallel connection may be made using only the cell cartridges 13A or the cell cartridges 13B, or a group of parallel-connected cell cartridges 13A and a group of parallel-connected cell cartridges 13B may be serially connected. Formation of the cartridge connecting portion is not limited to that shown in FIG. 12, it may be properly designed in accordance with a shape of an output portion of the cell cartridge to be connected, a connecting manner of the cell cartridge or the like.

The fuel cell of the present invention in which the cell cartridge connecting plurality of the cell modules is used, and two or more cell cartridges are stored in the outer case and electrically connected can cause an electrochemical reaction by supplying hydrogen and the air to the bore side (the anode, specifically the fuel electrode in this embodiment) and the shell side (the cathode, specifically the air electrode in this embodiment) of the cell modules connected to the cell cartridge, and thereby generate the electric power. In this method, hydrogen gas is supplied to the bore side of the cell module, and the air is supplied to the shell side of the same.

Though it is not shown in the drawings, a hydrogen channel which runs from a hydrogen inlet 20a through an inside of a top plate 20b and opens at a lower face of the top plate is formed in a lid 20 of the outer case. Hydrogen gas passes through this channel, and reaches the anode module connecting portion 7 or the cathode module connecting portion 8 disposed on the upper face of the each cell cartridge, and then flows into the opening end which is inserted into the through hole of the module connecting portion, and thereby supplied into the hollow. As to the channel of hydrogen gas which runs from hydrogen supplying source through the through hole of the module connecting portion of the each cell cartridge and communicates into the hollow of the cell module, gas tightness thereof is kept in order to prevent hydrogen gas from leaking. For example, a connecting portion between an opening portion placed at the lower face of the top plate 20b of the lid 20 and the module connecting portion disposed on the upper face of the each cell cartridge is in a gastight state by means of O-ring or the like. In this embodiment, the opening end of the cell module is positioned at an upper face side, and hydrogen gas is supplied from the upper face side into the cell module, however the opening end may be positioned at a lower face side to supply hydrogen from the lower face side.

On the other hand, the air passes through the opened structure of the outer case (the mesh-like structure of the wall plate 16, 17), and flows into the outer case, and further passes through the opened structure of the each cell cartridge (the opening portion between the cathode output portion 12 and the anode output portion 11), and then flows into the cell cartridge, thus it is supplied to the shell side of the cell module. In this embodiment, since both the outer case and the cell cartridges have the opened structure capable of allowing the outside air to freely flow into there, it is not particularly necessary to provide with an air supplying source for supplying the air, and the air as the outside air can be naturally taken up from the opened structure and then supplied to the air electrode disposed on the shell side of the cell module. Therefore, the air supplying equipment and a space for mounting it are not necessary, thus a fuel cell with low cost and compact size can be designed.

In the fuel cell of the present invention, the outer case and the cell cartridges may not have the above described opened structure. For example, it is acceptable that an outer case not having the opened structure and cell cartridges having the opened structure are combined with each other, or that an outer case and cell cartridges both not having the opened structure are used. However, if in these case, an air supplying source is set up and a flow channel communicating from the air supplying source to the shell side of the cell module is provided.

As described above, the cell cartridge in the present invention which connects the current collectors of plurality of cell modules to each other and integrates them has a structure capable of being stored into the outer case or taken out from there while the cell modules are prevented from breakage and while an electric connection of the each cell module is kept. The cell cartridge further has a structure which can integrate electric power of plurality of cell modules and easily take up it. On the other hand, the outer case in the present invention has a structure which can electrically connect plurality of cell cartridges to each other merely by storing the cell cartridges described above at a predetermined position in the storing portion. That is, according to the fuel cell of the present invention, the cell cartridge can be easily stored into the outer case and easily taken out from the outer case, and it is easy to connect the cell cartridges with each other or release their connection at the time when storing or taking out the cell cartridges. Therefore, if any trouble is found at a part of the cell cartridge among plurality of cell cartridges stored in the outer case, only the cell cartridge giving rise to this trouble can be easily taken out. The cell cartridge thus taken out can be repaired or replaced to easily mounted again in the outer case. Further, if the outer case gives rise to any trouble, the cell cartridges can be used ever by renewal or repair of the outer case. Accordingly, the fuel cell of the present invention is not complicated for assembling and disassembling and it is excellent in maintenance.

The invention claimed is:

1. A fuel cell assembly comprising:
at least one cell cartridge comprised of two or more cell modules, each cell module comprising a hollow electrolyte membrane, a pair of electrodes disposed on a bore side and a shell side of the hollow electrolyte membrane and current collectors in contact with the electrodes in the pair respectively, each cell cartridge further having a fixing portion to fix the cell modules, the fixing portion defining a first face, a first side face and a second side face, which is on an opposite side of the first side face, of the cell cartridge and the first face having a large width compared to a narrow width of the first side face and the second side face, each cell cartridge further having module connecting portions to electrically connect the current collectors of the cell modules and a cathode output portion and an anode output portion to integrate cathodes and anodes of the connected cell modules respectively, the cathode output portion and the anode output portion located on the first side face and the second side face of the cell cartridge, the cathode output portion and anode output portion are planar and lie in the same region defined by at least one of the first side face or the second side face of the cell cartridge; and
an outer case for storing one or more cell cartridges, the outer case having a front face, a rear face, and two side faces disposed there between, the front face and the rear face having a large width compared to a narrow width of the outer case side faces, the outer case further having a storing portion for storing two or more cell cartridges, the outer case further having a plurality of planar cartridge connecting portions for electrically connecting the cathode output portions and the anode output portions of the stored cell cartridges to a cathode output terminal and an anode output terminal for integrating the cathode output portions and the anode output portions of the connected cell cartridges respectively, the cartridge connecting portions located on one or both of the front face or the rear face of the outer case such that the electrical connection between the cathode output portion and the cartridge connecting portion and the electrical connection between the anode output portion and the cartridge connecting portion is made without exerting pressure on the first face of the cell cartridges;
and the anode output portion and the cathode output portion of the cell cartridges, stored in the storing portion of the outer case, come into planar contact with respective cartridge connecting portions of the outer case to form planar physical contact and electric connections.

2. The fuel cell according to claim 1, wherein the cartridge connecting portions are regularly placed at predetermined positions on the front and rear faces of the outer case so as to correspond to positions of the cathode output portion and the anode output portion of each cell cartridge, and the cell cartridges are arranged so as to be connected to the output portion of an unlike-pole possessed by an adjacent cell cartridge.

3. The fuel cell according to claim 1, wherein the cartridge connecting portions are regularly placed at predetermined positions on the front and rear faces of the outer case so as to correspond to positions of the cathode output portion and the anode output portion of each cell cartridge, and the cell cartridges are arranged so as to be connected to the output portion of a like-pole possessed by an adjacent cell cartridge.

4. The fuel cell according to claim 1, wherein the fixing portion is comprised of a flat plate defining the front face, a pair of the cathode module connecting portions, and a pair of the anode module connecting portions, wherein each of the cathode and anode module connecting portions are located on an upper portion or a lower portion of both side faces of the cell cartridge.

5. The fuel cell according to claim 1, wherein the cell cartridge has a low-profile rectangular parallelepiped shape defined by the fixing portion, the fixing portion comprising the front face and a rear face formed from a flat plate and having a large width, and the module connecting portions comprised of a pair of the cathode module connecting portions and a pair of the anode module connecting portions, wherein one of the anode module connecting portion or the cathode module connecting portion is located on the upper portion of the side face of the cell cartridge and the other of the anode module connecting portion or the cathode module connecting portion is located on the lower portion.

6. The fuel cell according to claim 1, wherein each of the cathode and anode module connecting portions has two or more holes which are capable of inserting an end portion of a cell module therein and formed with a predetermined arrangement, wherein
the cathode output portions are connected to both ends in a length direction of the cathode module connecting portion and bended to be placed on each side face of the cell cartridge;
the anode output portions are connected to both ends in a length direction of the anode module connecting portion and bended to be placed on each side face of the cell cartridge; and
each cell module is arranged so that both ends thereof are inserted in the holes of the cathode and anode connecting portions and a cathode current collector of the cell module is connected to the cathode module connecting portion and an anode current collector of the cell module is connected to the anode module connecting portion.

7. The fuel cell according to claim 5, wherein each of the cathode and anode module connecting portions has two or more holes which are capable of inserting an end portion of a cell module therein and formed with a predetermined arrangement, wherein
the cathode output portions are connected to both ends in a length direction of the cathode module connecting portion and bended to be placed on each side face of the cell cartridge;
the anode output portions are connected to both ends in a length direction of the anode module connecting portion and bended to be placed on each side face of the cell cartridge; and
each cell module is arranged so that both ends thereof are inserted in the holes of the cathode and anode connecting portions and a cathode current collector of the cell module is connected to the cathode module connecting portion and an anode current collector of the cell module is connected to the anode module connecting portion.

8. A fuel cell according to claim 7, wherein each of the cell modules has an open end and a closed end and the fuel cell includes:

a first cell cartridge in which the anode module connecting portion is placed on the upper portion of the side faces of the cell cartridge and the holes formed on the anode module connecting portion for inserting the cell module are through-holes, wherein the open ends of the cell modules are inserted in the through-holes of the anode module connecting portion, and the anode current collectors of the cell modules are connected to the anode module connecting portion, and a second cell cartridge in which the cathode module connecting portion is placed on the upper portion of the side faces of the cell cartridge and the holes formed on the cathode module connecting portion for inserting the cell module are through-holes, wherein the open ends of the cell modules are inserted in the through-holes of the cathode module connecting portion, and the cathode current collectors of the cell modules are connected to the cathode module connecting portion;

wherein the first and second cell cartridges are arranged in the storing portion of the outer case so that both the anode module connecting portion and the cathode connecting portion connect to the upper portion of the rear and front faces of the outer case to serially connect the first and second cell cartridges.

9. A fuel cell according to claim 1 wherein each cell module is provided with an air electrode on the shell side of the hollow electrolyte membrane, and the cell cartridge and the outer case have an opened structure capable of allowing the outside air to freely flow there through.

10. A fuel cell according to claim 2 wherein each cell module is provided with an air electrode on the shell side of the hollow electrolyte membrane, and the cell cartridge and the outer case have an opened structure capable of allowing the outside air to freely flow there through.

11. A fuel cell according to claim 3 wherein each cell module is provided with an air electrode on the shell side of the hollow electrolyte membrane, and the cell cartridge and the outer case have an opened structure capable of allowing the outside air to freely flow there through.

12. A fuel cell according to claim 4 wherein each cell module is provided with an air electrode on the shell side of the hollow electrolyte membrane, and the cell cartridge and the outer case have an opened structure capable of allowing the outside air to freely flow there through.

13. A fuel cell according to claim 5 wherein each cell module is provided with an air electrode on the shell side of the hollow electrolyte membrane, and the cell cartridge and the outer case have an opened structure capable of allowing the outside air to freely flow there through.

14. A fuel cell according to claim 6 wherein each cell module is provided with an air electrode on the shell side of the hollow electrolyte membrane, and the cell cartridge and the outer case have an opened structure capable of allowing the outside air to freely flow there through.

15. A fuel cell according to claim 7 wherein each cell module is provided with an air electrode on the shell side of the hollow electrolyte membrane, and the cell cartridge and the outer case have an opened structure capable of allowing the outside air to freely flow there through.

16. A fuel cell according to claim 8 wherein each cell module is provided with an air electrode on the shell side of the hollow electrolyte membrane, and the cell cartridge and the outer case have an opened structure capable of allowing the outside air to freely flow there through.

* * * * *